Aug. 10, 1926.
H. D. HINELINE
LOAD INDICATOR FOR TRANSFORMERS
Filed Nov. 14, 1922
1,595,781
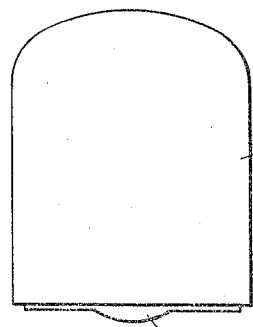
Fig. 1
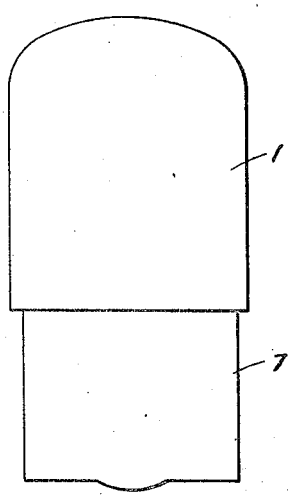
Fig. 2
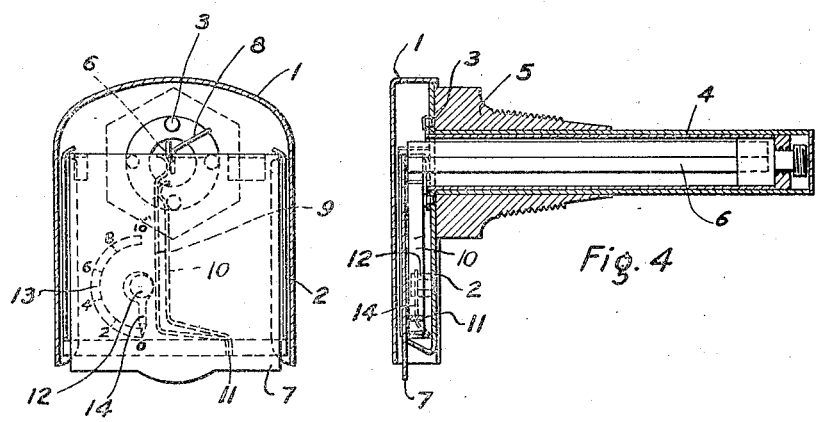
Fig. 3
Fig. 4
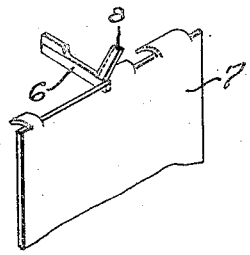
Fig. 5
WITNESSES:
INVENTOR
Harris D. Hineline
BY
ATTORNEY Patented Aug. 10, 1926.

1,595,781

UNITED STATES PATENT OFFICE.

HARRIS D. HINELINE, OF AKRON, OHIO, ASSIGNOR TO WESTINGHOUSE ELECTRIC & MANUFACTURING COMPANY, A CORPORATION OF PENNSYLVANIA.

LOAD INDICATOR FOR TRANSFORMERS.

Application filed November 14, 1922. Serial No. 600,911.

My invention relates to electric transformers and more particularly to means for indicating the temperature within such transformers.

One object of my invention is to provide a signal device which will indicate the temperature within a transformer casing, in combination with means for calibrating the temperature at which the signal is actuated.

Another object of my invention is to provide a thermal indicator comprising a bimetallic element and a signal device released upon a predetermined distortion of said bimetallic element, and means for calibrating the temperature at which the bimetallic element releases the signal.

A further object of my invention is to provide a spring bearing on a bimetallic element with adjustable means for varying the forces exerted by the spring on the bimetallic element.

It is also an object of my invention to provide a thermal indicator with means for automatically compensating the indicator in accordance with changes in the ambient temperature after the device has been tested in service.

In the application of William M. Bradshaw filed December 7, 1920, Serial No. 429,031, and assigned to the Westinghouse Electric & Manufacturing Company, is shown and described a temperature indicator for transformers of this general character. My invention provides an improvement in the calibration of such indicator with relation to the desired temperature within the transformer casing.

In the accompanying drawing,

Figure 1 is a face view of an indicator embodying my invention and occupying its closed position.

Fig. 2 is a similar view of the indicator in an open or operative position.

Fig. 3 is a transverse sectional view of the indicator.

Fig. 4 is a longitudinal sectional view of the temperature indicator.

Fig. 5 is a fragmentary view, in perspective, of the indicator and thermoresponsive member in the non-indicating or latched position.

In the several figures of the drawing, similar reference numerals indicate like parts.

In the preferred embodiment of my invention, a cover 1 encloses a substantially rectangular frame 2. The frame 2 is secured by rivets 3, or by welding, to a cylinder 4 that is inserted in a threaded bushing 5 and that houses a bimetallic thermally responsive member 6. The inner end of member 6 is rigidly secured within the cylinder 4, as is shown in Fig. 4.

A target or semaphore 7 is mounted in the frame 1 and is normally detachably held in engagement with the bimetallic member 6 by a suitable latch 8 rigidly mounted on the back of the semaphore 7. A spring 9 is suitably secured, at one end 11, to the frame 2, as by crimping, welding or soldering. The free end or spring 9 bears against bimetallic member 6 and normally biases that member into a position where it engages the latch 8. A bimetallic member 10 is secured, at one end, to the end 11 of the spring 9, and, at its free end, bears firmly against the spring 9 adjacent to the point of contact between the spring 9 and the bimetallic member 6, as is shown in Figure 3. The bimetallic member 10 is designed to normally bend, upon an increase in temperature, in a direction opposite to that of the member 6.

Mounted on the casing 2 is a cam 12 which bears against the spring 9. A scale 13 and a pointer 14 serve to calibrate the pressure exerted by the cam upon the spring.

In the operation of my invention, the temperature applied to the cylinder 4 results in a corresponding distortion of the bimetallic member 6, in a manner characteristic of bimetallic strips. After a predetermined movement of the free end of member 6, it moves from under the latch 8, thereby allowing the latch 8 and the attached semaphore 7 to fall by gravity. This action may be understood by reference to Fig. 3 of the drawing, wherein movement of member 6 to the left, against the pressure of spring 9, permits the semaphore 7 to fall. The construction of cylinder 4, bushing 5 and bimetallic member 6 is such that the frame 2 normally assumes a vertical position. These features, however, do not constiute the subject-matter of my invention.

The spring 9 is positioned to normally oppose the movement of the bimetallic member 6 during increase of the temperature surrounding it. The cam member 12 is so mounted on the frame 2 that it forms a fulcrum about which the free end of the spring 9 turns, against the force of the bimetallic members 6 and 10. By varying the distance between the axis of the cam 12 and the point of tangency to the spring 9, an accompanying variation in the pressure applied to the member 6 is produced. By calibrating this movement with relation to a fixed scale 13 for various desired temperatures within the device to be protected, it is obvious that the signal 7 may be set to operate at any predetermined temperature. During the slight thermal changes which take place because of changes in the ambient temperature within the indicator frame, the bimetallic members 6 and 10 tend to move in opposite directions, the bending of the member 10 results in a decreasing force exerted on the spring 9, permitting the latter to exert a correspondingly increasing force against the bimetallic member 6.

Bimetallic member 10 is far enough removed from the temperature of the oil in the transformer tank that it is not appreciably affected thereby, but remains an automatic compensating means for changes in the ambient temperature of the air surrounding the indicator.

By my invention, it is possible to calibrate the safe working temperature of the electrical device for changes in seasonal temperatures, as well as the current-carrying capacity of the electrical device.

While I have shown and described a preferred form of my invention, it is to be understood that such changes may be made in the form and arrangement of the component parts thereof as fall within the spirit and scope of my invention as defined in the accompanying claims.

I claim as my invention:

1. In a thermal indicator, a thermo-responsive element, means for biasing said thermo-responsive member into a predetermined position, a semaphore detachably secured by said thermo-responsive member when in the predetermined position, and cam means for controlling said biasing means.

2. In a thermal indicator, a thermo-responsive element, means for biasing said thermo-responsive member into a predetermined position, a semaphore detachably secured by said thermo-responsive member when in the predetermined position, and a cam in combination with an indicating scale for controlling said biasing means.

3. In a thermal indicator the combination with a thermo-responsive member, an indicator, and means for releasing said indicator upon predetermined excitation of said thermo-responsive member, of a resilient member biasing said thermo-responsive element into a normal position, and a cam for controlling the degree of bias in said resilient member.

4. A temperature indicator for a heat-developing translating device, comprising a movable semaphore having indicating and non-indicating positions, a thermally-responsive member subjected to the temperature of a portion of the translating device for releasably supporting said semaphore and a second thermally-responsive member subjected to the temperature of the ambient air for compensating said first named thermally-responsive member.

5. The combination with a thermo-responsive element, of means comprising a manually adjustable thermostatic member for initially biasing said thermo-responsive element into a predetermined position to vary its operative temperature.

6. The combination with a bimetallic member, of means comprising a manually adjustable and oppositely acting bimetallic member for initially biasing said first bimetallic member into a predetermined position for varying its effective temperature.

7. The combination with a thermo-responsive element, of a resilient member for biasing said thermo-responsive element into a predetermined position, a second thermo-responsive element associated with said first element and said resilient member, and manual means for initially adjusting the force of said resilient member and said second thermo-responsive element.

In testimony whereof, I have hereunto subscribed my name this 3rd day of November 1922.

HARRIS D. HINELINE.

Certificate of Correction.

It is hereby certified that in Letters Patent No. 1,595,781, granted August 10, 1926, upon the application of Harris D. Hineline, of Akron, Ohio, for an improvement in "Load Indicators for Transformers," an error appears in the printed specification requiring correction as follows: Page 2, line 88, claim 6, after the word "effective" insert the word *operating;* and that the said Letters Patent should be read with this correction therein that the same may conform to the record of the case in the Patent Office.

Signed and sealed this 28th day of September, A. D. 1926.

[SEAL.]
M. J. MOORE,
*Acting Commissioner of Patents.*